United States Patent
Kobayashi

(10) Patent No.: US 6,487,373 B2
(45) Date of Patent: Nov. 26, 2002

(54) SHUTTER RELEASE UNIT HAVING MULTIPLE FUNCTIONS

(75) Inventor: Kiyotaka Kobayashi, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/829,989

(22) Filed: Apr. 11, 2001

(65) Prior Publication Data

US 2001/0028794 A1 Oct. 11, 2001

(30) Foreign Application Priority Data

Apr. 11, 2000 (JP) ........................................ 2000-108828

(51) Int. Cl.[7] .............................................. G03B 17/00
(52) U.S. Cl. ........................................ 396/263; 396/543
(58) Field of Search ............................ 396/6, 263, 535, 396/543

(56) References Cited

U.S. PATENT DOCUMENTS 5,559,573 A * 9/1996 Kamoda et al. ............ 396/535
5,867,742 A 2/1999 Salvas et al. ................ 396/263
5,926,660 A * 7/1999 Salvas et al. ................ 396/264
6,132,112 A 10/2000 DiRisio ....................... 396/503

* cited by examiner

Primary Examiner—David M. Gray
(74) Attorney, Agent, or Firm—Sughrue Mion, PLLC

(57) ABSTRACT

A shutter release member is rotatably coupled to a lens holder covering member. When a shutter button is depressed, a lever is rotated in counterclockwise direction, so the electrical contact assembly is also rotated. The movement of the electrical contact assembly is larger than that of the shutter button. Then, third and fourth electrical contact arms come in contact with fourth and fifth electrical contact pads, by which red-eye reduction device is activated. Concurrently, a shutter actuation lever is moved to activate a shutter mechanism for carry out an exposure. When an external force applied to the shutter button is weakened, the shutter actuation lever returns back to initial position by a bias of a biasing plate. A sixth electrical contact arm is moved to come in contact with a third electrical contact again, so a film winding mechanism is activated to feed a photo filmstrip by one frame.

15 Claims, 3 Drawing Sheets

SHUTTER RELEASE UNIT HAVING MULTIPLE FUNCTIONS

BACKGROUND OF THE INVENTION

1. Field of the Invention

The present invention relates to a shutter release unit that is incorporated in a camera and swung in accordance with shutter release operation, for activating plural devices for photography.

2. Background Arts

In order to reduce manufacturing cost of a camera, it is preferable to furnish a camera component with multiple functions. For example, a shutter release member is well-known in a compact camera, wherein the shutter release member includes a shutter button and a shutter release lever for actuating a shutter release mechanism of the camera.

U.S. Pat. No. 5,867,742 discloses a shutter release member which is coupled to a camera body in a slidable fashion. The shutter release member is comprised of a shutter button arm, a shutter actuation arm and an electrical contact arm, which are provided integrally with a sliding member movably coupled to the camera body. The electrical contact arm includes electrical contact elements. The sliding member is biased by a spring member to an initial position. When an user depressed the shutter button arm against the bias of the spring member, the sliding member is slid down from the initial position. Then, the shutter actuation arm interacts with a shutter lock member to activate a shutter release mechanism. Thereby, a subject image is exposed to a photo filmstrip. Concurrently, the electrical contact arm is also slid, and the electrical contact elements come in contact with electrical contact pads provided on a circuit board that is coupled to the camera body. Thereby, an electrical device, such as a flash control circuit, is activated to carry out electrical operation.

Meanwhile, in case of night or indoor photography of a person with the pupil of the eye fully open, red-eye effect is likely to occur, by which person's eyes on a print are colored red like rabbit's eyes. In order to prevent the red-eye effect, it is desirable to make a red-eye reduction device for emitting weak light prior to emission of flash light, for shrinking pupils. Most compact cameras have such a red-eye reduction device as well as flash device. The compact camera also includes a film winding mechanism including a feeding motor, which is automatically driven to feed the photo filmstrip frame by frame after photography. These red-eye reduction device and film winding mechanism are sequentially controlled by use of a microcomputer.

In order to reduce manufacturing cost of the compact camera, it is preferable to assign switches for activating the devices, such as the red-eye reduction device and the film winding mechanism, to the shutter release member. In case of applying the multi functional shutter release unit disclosed in the above U.S. Patent, however, the electrical contact arm is required to be positioned with high accuracy for enabling sequential operation of the camera. Accordingly, it is difficult to provide such a release button member with a compact camera of low-cost type.

Moreover, in the shutter release unit of the above U.S. Patent, a spring member is needed for biasing the shutter release unit toward the initial position. In order to prevent increase in manufacturing cost, it is desirable to decrease parts number by omitting the spring member.

SUMMARY OF THE INVENTION

In view of the foregoing, an object of the present invention is to provide a shutter release unit for enabling sequential operation of the preliminary flash emission mechanism and the film feeding mechanism without increasing manufacturing cost.

To achieve the above objects, a shutter release unit of the present invention comprises an unit holder, a lever rotatably attached to the unit holder, and a shutter button, a shutter actuation member and a biasing member, which are integrated in the lever. The shutter button is exposed through an opening formed in a housing of the camera. When the shutter button is depressed, the lever and the shutter actuation member are rotated to carry out shutter release operation.

The unit holder is attached to a lens covering member which covers a lens holder for securing a taking lens of the camera. Since the lever is not attached directly to the main body of the camera, it is possible to design the camera configuration more freely. The unit holder may be attached to the lens holder or the housing.

The biasing member is bent to form an L-shape, and an end portion thereof comes in contact with an inner wall of the housing. Thus, the biasing member is resiliently deformed in accordance with depression of the shutter button, so that the shutter button is biased toward an initial position. Since the biasing member is integrated in the lever, it is possible to reduce manufacturing cost by omitting a spring.

The shutter release unit includes a switch arm, which is positioned further from a pivot of the lever than the shutter button. The switch arm is rotated from a first position to a second position in accordance with depression of the shutter button. Plural electrical contact arms are mounted on an end portion of the switch arm. The electrical contact arms come in contact with plural electrical contact pads provided on a printed circuit board, on which a plurality of electric circuits for driving a red-eye reduction device, a film winding mechanism and so forth are mounted. When the shutter button is depressed, the switch arm is moved to the second position. Then, contacting condition between the between said electrical contact arms and said electrical contact pads is switched, so the red-eye reduction device is activated. When the shutter button is returned back to the first position, the contacting condition is switched again, so the film winding mechanism is activated to feed a photo filmstrip by one frame.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENT

Figure 1:
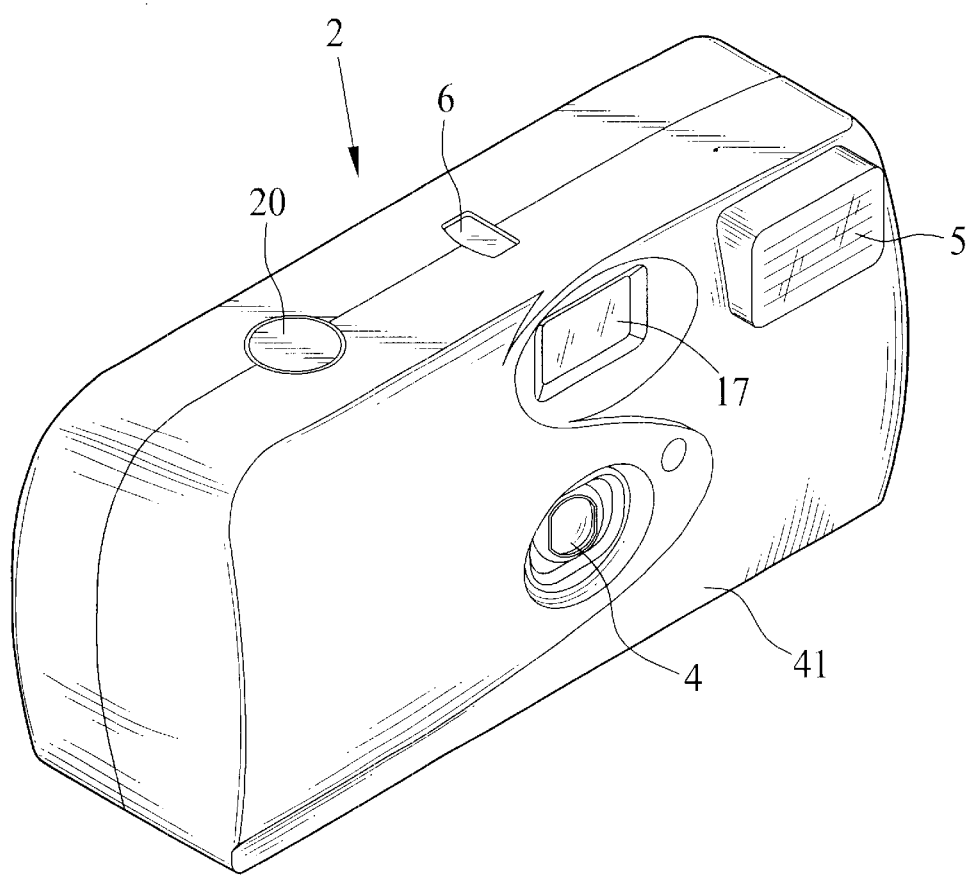
FIG. 1 is a perspective view of a camera having a shutter release unit of the present invention.

FIG. 1 shows an appearance of a camera 2 in which a shutter release unit of the present invention is incorporated. The camera 2 is comprised of a main body 40 (see FIG. 3)

and a housing 41 for covering the main body 40. A taking lens 4, a view finder 17 and a flash projector 5 are provided in a front side of the camera 2. In an upper side of the housing 41 are formed openings, through which a shutter button 20 and a frame counter window 6 are appeared. In a rear side of the camera 2, an eyepiece window is provided.

Figure 2:
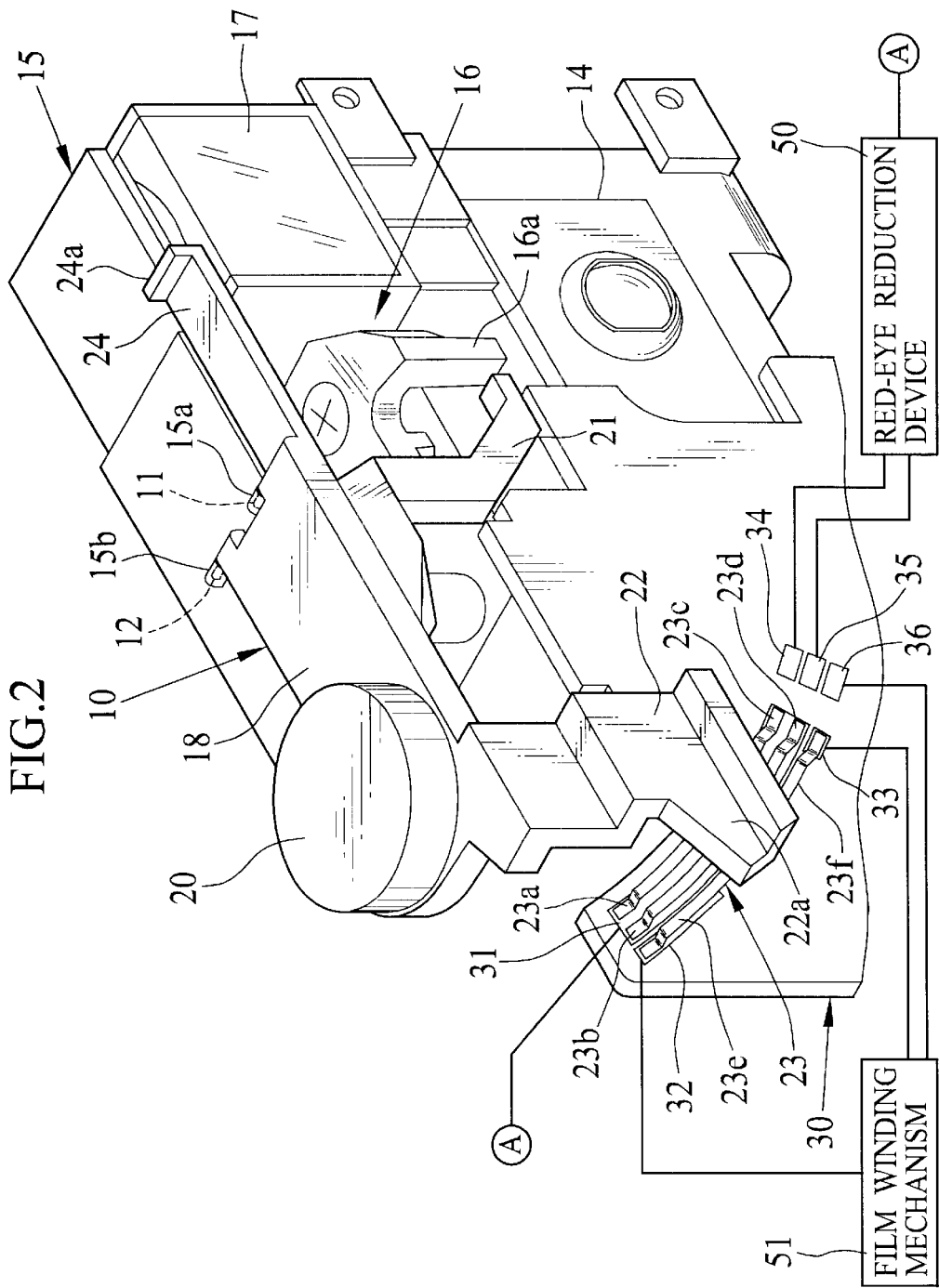
FIG. 2 is a partially perspective view of inner parts of the camera of FIG. 1.
Figure 3:
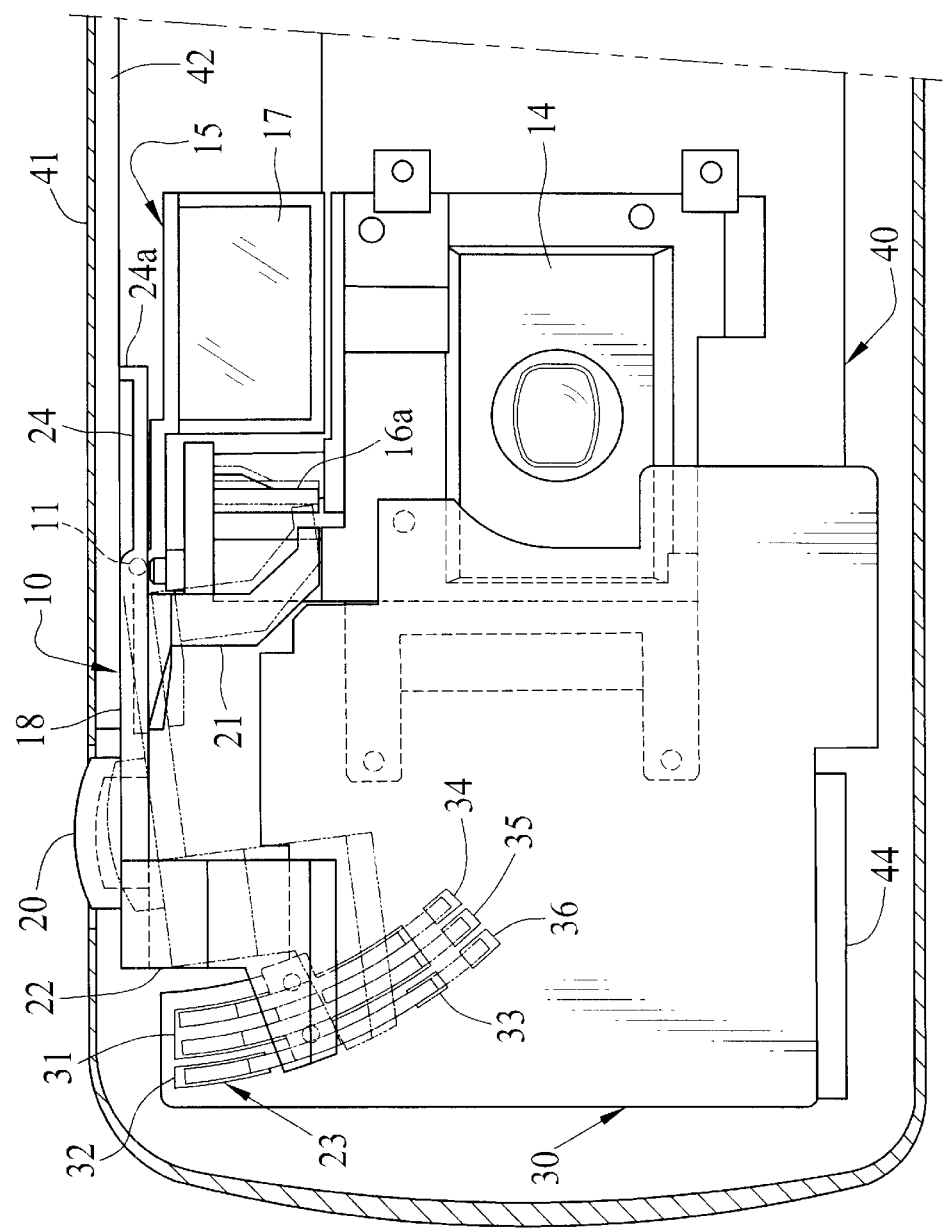
FIG. 3 is a partially planer view of inner parts of the camera, in which the shutter release unit is in operation.

In FIGS. 2 and 3, the shutter release member 10 includes two pivots 11, 12 which are arranged to form a linear fulcrum. The pivots 11, 12 are respectively inserted in shaft bearings 15a, 15b which are integrated with a lens holder covering member 15. The lens holder covering member 15 covers an upper portion of a lens holder 14 for securing the taking lens 4. Thus, the shutter release member 10 is rotatable around the shaft bearings 15a, 15b.

A shutter mechanism 16 and a view finder optical system 17 are provided in an upper portion of the lens holder 14. The lens holder covering member 15 is coupled to the main body 40 so as to cover the upper portion of the shutter mechanism 16 and the view finder optical system 17. The main body 40 includes a cartridge loading chamber for loading a film cartridge with a photo filmstrip, a film take-up chamber for containing exposed frames of the photo filmstrip, and a base portion including a lens tube 14, which is provided between the cartridge loading chamber and the film take-up chamber.

The shutter release member 10 includes a lever 18 extended in a crosswise direction of the camera 2, and the shutter button 20 having a cylindrical shape, a shutter actuation arm 21, a switch arm 22, an electrical contact assembly 23 and a biasing plate 24, which are integrated into the lever 18. The shutter release member 10 and the shaft bearings 15a, 15b comprise a shutter release unit of the present invention.

The pivots 11, 12 are provided on one end of the lever 18, and the shutter button 20 is provided on an upper surface of the lever 18 opposite to the pivots 11, 12. The shutter actuation arm 21 is provided on the bottom surface of the lever 18 between the shutter button 20 and the pivots 11, 12, and is extended toward a interlock lever 16a of the shutter mechanism 16. The switch arm 22 is extended below the shutter button 20, and an end portion thereof 22a is oriented in the crosswise direction of the camera 2. The electrical contact assembly 23 is comprised of six electrical contacts 23a to 23f, all of which are secured to an end portion 22a of the switch arm 22. The first, second and fifth electrical contact arms 23a, 23b and 23e are extended in one direction, and the other three electrical contact arms 23c, 23d and 23f are extended in the opposite direction. The biasing plate 24 is provided on the one end of the lever 18, and is extended in the crosswise direction of the camera 2 toward the view finder optical system 17.

The shutter mechanism 16 includes a shutter driving lever for moving a shutter blade. An optical path of the taking lens 4 is shielded by the shutter blade. The shutter driving lever is usually locked at a charged position by the interlock lever 16a. When the interlock lever 16a is moved, the shutter driving lever is released to be activated by a bias of a spring, and strike the shutter blade. Then, the shutter blade is swung, so that subject light is exposed to a photo filmstrip through the taking lens 4.

In front of the lens holder 14 is provided a printed circuit board 30, on which a plurality of electric circuits for driving a red-eye reduction device 50, a film winding mechanism 51 and so forth are mounted. A wide and long first electrical contact pad 31, and narrow and short second to sixth electrical contact pads 32 to 36 are also formed on the printed circuit board 30. The second to sixth electrical contact pads 32 to 36 have same width, but the second electrical contact pad 32 is longer than other electrical contact pads 33 to 36. On the other hand, the first to fourth electrical contact arms 23a to 23d are integrated and electrically conducted to one another. The fifth and sixth electrical contact arms 23e and 23f are integrated and electrically conducted to each other. The first to fourth electrical contact arms 23a to 23d are insulated from the other electrical contact arms 23e, 23f. The first to sixth electrical contact pads 31 to 36 are slightly curved to fit the rotational movement of the electrical contact arms 23a to 23f.

The first to fourth electrical contact arms 23a to 23d, and the first, fourth and fifth electrical contact pads 31, 34 and 35 comprise a switch for activating the red-eye reduction device 50 for projecting preliminary flash light for shrinking pupils. In addition, the fifth and sixth electrical contact arms 23e, 23f, and the second, third and sixth electrical contact pads 32, 33 and 36 comprise a switch for activating the film winding mechanism 51 for feeding a photo filmstrip by one frame after photography.

The electrical contact assembly 23 is secured to the end portion 22a of the switch arm 22, positioned further from the pivots 11, 12 than the shutter button 20. Since the shutter release member 10 is rotated around the pivots 11, 12, so the movement of the electrical contact assembly 23 is larger than the stroke of the shutter release member 10. Thus, it is possible to determine the sizes and positions of the electrical contact pads 31 to 36 without high accuracy, so the yield rate of the printed circuit board 30 can be increased.

The biasing plate 24 is thinner than the first arm 18, and an end portion thereof 24a is bent to form an L-shape. On an inner wall of the housing 41 is formed a rib 42, with which the end portion 24a of the biasing plate 24 is kept in contact. Thereby, since the end portion 24a is not able to rotate when the shutter button 20 is depressed, the biasing plate 24 is resiliently deformed. Thus, the lever 18 is biased toward an initial position shown in FIG. 2.

Next, operation of the shutter release unit having the above configuration will be described. In this embodiment, night or indoor photography is assumed, so the red-eye reduction device 50 is activated in photography. In an initial state where no external force is applied to the shutter button 20, the first to forth electrical contact arms 23a to 23d come in contact with the first electrical contact pad 31, and the other electrical contact arms 23e, 23f come in contact with the second and third electrical contact pads 32, 33, as shown by the solid line in FIG. 3. In that state, the red-eye reduction device 50 is not activated, so preliminary flash light is not projected. Moreover, in that state, the film winding mechanism 51 is not activated, so the photo filmstrip is not wound. The shutter driving lever is retained at the charge position by the interlock lever 16a.

When the shutter button 20 is depressed, the lever 18 is rotated in counterclockwise direction around the pivots 11, 12, as shown by the two-dotted line in FIG. 3. Concurrently, the electrical contact assembly 23, secured to the end portion 22a, is rotated largely in counterclockwise direction. Thereby, the third and fourth electrical contact arms 23c, 23d come in contact with the fourth and fifth electrical contact pads 34, 35, so that the red-eye reduction device 50 is activated to project preliminary flash light.

Successively, the shutter actuation lever 21 is rotated in counterclockwise direction, to come in contact with the interlock lever 16a, and pushes it. Then, the shutter driving lever is released to rotate by a bias of a spring, and strike the shutter blade. Thereby, the photo filmstrip is exposed to subject light. At that time, a triggering switch of a flash device is turned on to emit flash light through the flash projector 5. Moreover, the sixth electrical contact arm 23*f* is also rotated to be away from the third electrical contact pad 33, and comes in contact with the sixth electrical contact pad 36.

When an external force applied to the shutter button 20 is weakened, the shutter button 20, the shutter actuation lever 21 and the electrical contact assembly 23 rotates in clockwise direction by the bias of the biasing plate 24, and returns back to initial positions. The sixth electrical contact arm 23*f* is also rotated in clockwise direction, to come in contact with the third electrical contact 33 again. Then, the film winding mechanism 51 is activated to feed the photo filmstrip by one frame. Concurrently, the shutter mechanism 16 is also activated to move the shutter driving lever to the charged position, and be on standby for the succeeding photography.

In the above embodiment, the shutter release member 10 is coupled to the lens holder covering member 15. But the shutter release member 10 may be attached to the housing 41 or the lens holder 14, insofar as it is not directly coupled to the main body 40.

The shutter release mechanism is assembled between the main body 40 and the shutter button 20, so it is preferable for freer design of the camera 2 to assemble the shutter release member 10 to parts of the camera 2, such as the shutter release mechanism, the lens holder covering member 15 and so on, which are positioned closer to the shutter button 20 than the main body 40.

In the above embodiment, the electronic contact assembly 23 for turning on electrical circuits is provided as activation means, but it is also possible to apply a machinery for carrying out mechanical operation, such as a flash pop-up mechanism for emerging the flash projector from the housing.

Thus, the present invention is not to be limited to the above embodiments, but on the contrary, various modifications are possible to those skilled in the art without departing from the scope of claims appended hereto.

What is claimed is:

1. A shutter release unit for a camera comprising:
   a unit holder;
   a lever rotatably attached to said unit holder;
   a shutter button integrated with said lever;
   a shutter actuation member integrated with said lever, said shutter actuation member being rotated from an initial position to a release position for carrying out a shutter release operation in accordance with a depression of said shutter button;
   a biasing member integrated with said lever opposite to said shutter button with respect to a pivot of said lever, said biasing member being resiliently deformed in accordance with the depression of said shutter button, to bias said shutter button toward an initial position;
   a switch arm integrated with said lever; and
   a plurality of electrical contact arms mounted on said switch arm,
   wherein said switch arm is positioned further from said pivot of said lever than said shutter button.

2. The unit as defined in claim 1, wherein said camera includes a main body and a housing for covering said main body, and
   wherein said shutter button is exposed outside through an opening formed in said housing.

3. The unit as defined in claim 2, wherein said biasing member has an L-shape, an end portion of said biasing member contacting with an inner wall of said housing.

4. The unit as defined in claim 3, wherein said switch arm is biased toward a first position by said biasing member and is rotated to a second position in accordance with the depression of said shutter button, a predetermined sequence of photography being started by a movement of said switch arm between said first position and said second position.

5. The unit as defined in claim 4, wherein said camera includes a taking lens, a lens holder for securing said taking lens and a cover member for covering an upper portion of said lens holder, and
   wherein said unit holder is attached to said cover member.

6. The unit as defined in claim 4, wherein said camera includes a taking lens, and a lens holder for securing said taking lens, and
   wherein said unit holder is attached to said lens holder.

7. The unit as defined in claim 4, wherein said unit holder is attached to said housing.

8. The unit as defined in claim 3, further comprising:
   a printed circuit board having a plurality of electrical contact pads, which come in contact with said electrical contact arms,
   wherein a contacting condition between said electrical contact arms and said electrical contact pads is switched in accordance with a rotation of said switch arm between a first position and a second position, by which a predetermined sequence of photography is started.

9. The unit as defined in claim 8, wherein said switch arm is provided below said shutter button.

10. The unit as defined in claim 9, wherein said electrical contact pads are curved to fit the rotation of said electrical contact arms.

11. The unit as defined in claim 10, wherein said camera includes a taking lens, a lens holder for securing said taking lens and a cover member for covering an upper portion of said lens holder, and
    wherein said unit holder is attached to said cover member.

12. The unit as defined in claim 10, wherein said camera includes a taking lens, and a lens holder for securing said taking lens, and
    wherein said unit holder is attached to said lens holder.

13. The unit as defined in claim 10, wherein said unit holder is attached to said housing.

14. A shutter release unit for a camera comprising:
    a holder;
    a lever attached to said holder for rotation about a pivot;
    a shutter button provided on said lever;
    a shutter actuation member provided on said lever;
    a biasing member provided on said lever, said biasing member influencing said shutter button toward an initial position;
    a switch arm provided on said lever, said switch arm supporting a plurality of electrical contact arms,
    wherein said electrical contact arms are positioned further from said pivot than said shutter button.

15. The unit as defined in claim 14, further comprising:
    a printed circuit board having a plurality of electrical contact pads, which come in contact with said electrical contact arms,
    wherein said electrical contact arms selectively contact said electrical contact pads based on a rotation of said switch arm between a first position and a second position.

* * * * *